(12) United States Patent
Griffin et al.

(10) Patent No.: US 12,639,077 B2
(45) Date of Patent: May 26, 2026

(54) BOOTABLE SYSTEM IMAGE DELTA GENERATOR

(71) Applicant: Red Hat, Inc., Raleigh, NC (US)

(72) Inventors: Leigh Griffin, Waterford (IE);
Pierre-Yves Chibon, Puteaux (FR)

(73) Assignee: Red Hat, LLC, Raleigh, NC (US)

( * ) Notice: Subject to any disclaimer, the term of this patent is extended or adjusted under 35 U.S.C. 154(b) by 313 days.

(21) Appl. No.: 18/192,051

(22) Filed: Mar. 29, 2023

(65) Prior Publication Data

US 2024/0330002 A1     Oct. 3, 2024

(51) Int. Cl.
*G06F 9/4401*          (2018.01)

(52) U.S. Cl.
CPC .................................. *G06F 9/4401* (2013.01)

(58) Field of Classification Search
CPC ...................................................... G06F 9/4401
See application file for complete search history.

(56) References Cited

U.S. PATENT DOCUMENTS

| | | | | |
|---|---|---|---|---|
| 8,255,361 | B2 * | 8/2012 | Igouchkine | ............. G06F 8/658 707/646 |
| 10,931,746 | B2 | 2/2021 | Scrivano | |
| 2018/0088926 | A1 * | 3/2018 | Abrams | ................ H04L 67/568 |
| 2018/0349129 | A1 * | 12/2018 | Ju | ............................ G06F 8/654 |
| 2019/0146772 | A1 * | 5/2019 | Griffin | ................ G06F 11/3698 717/121 |
| 2019/0310872 | A1 * | 10/2019 | Griffin | ...................... G06F 8/71 |
| 2020/0026524 | A1 * | 1/2020 | Roland | ................. G06F 3/0617 |
| 2021/0279052 | A1 * | 9/2021 | Nabar | ................. G06F 9/30094 |
| 2023/0384750 | A1 * | 11/2023 | Fox | .................... G05B 19/0426 |
| 2024/0340279 | A1 * | 10/2024 | Horowitz | ................ H04L 67/12 |

FOREIGN PATENT DOCUMENTS

| | | |
|---|---|---|
| CN | 114764335 A | 7/2022 |
| WO | 2022216752 A1 | 10/2022 |

OTHER PUBLICATIONS

Boccassi, Luca, et al., "A report from the 2022 Image-Based Linux Summit," LMN.net, https://lwn.net/Articles/912774/, Nov. 3, 2022, 10 pages.
Breard, Ben, et al., "RHEL for Edge: update infrastructure quickstart," Red Hat Blog, https://www.redhat.com/en/blog/thel-edge-update-infrastructure-quickstart, Jun. 28, 2021, 9 pages.

(Continued)

*Primary Examiner* — Nimesh G Patel
(74) *Attorney, Agent, or Firm* — Dority & Manning, P.A.

(57) ABSTRACT

A request is received from a fleet device to be provided with a delta system image that includes differences between a system image currently residing on the fleet device and a most recent revised system image. It is determined that a first revised system image has been generated, and a second revised system image has been generated, wherein the second revised system image is the most recent revised system image. It is determined that the system image currently residing on the fleet device is the first system image. A first delta system image that includes differences between the first system image and the second revised system image is accessed. The first delta system image is sent to the fleet device.

20 Claims, 10 Drawing Sheets

START

RECEIVE, BY A COMPUTING DEVICE FROM A FIRST FLEET DEVICE OF A PLURALITY OF FLEET DEVICES, A REQUEST TO BE PROVIDED WITH A DELTA SYSTEM IMAGE THAT INCLUDES DIFFERENCES BETWEEN A SYSTEM IMAGE CURRENTLY RESIDING ON THE FIRST FLEET DEVICE AND A MOST RECENT REVISED SYSTEM IMAGE STORED IN A REPOSITORY EXTERNAL TO THE FIRST FLEET DEVICE ⟶1000

DETERMINE, BY THE COMPUTING DEVICE, THAT A FIRST REVISION HAS BEEN COMMITTED TO A FIRST SYSTEM IMAGE TO GENERATE A FIRST REVISED SYSTEM IMAGE, AND A SECOND SUBSEQUENT REVISION HAS BEEN COMMITTED TO THE FIRST REVISED SYSTEM IMAGE TO GENERATE A SECOND REVISED SYSTEM IMAGE, WHEREIN THE SECOND REVISED SYSTEM IMAGE COMPRISES THE MOST RECENT REVISED SYSTEM IMAGE ⟶1002

DETERMINE, BY THE COMPUTING DEVICE, THAT THE SYSTEM IMAGE CURRENTLY RESIDING ON THE FIRST FLEET DEVICE COMPRISES THE FIRST SYSTEM IMAGE ⟶1004

GENERATE, BY THE COMPUTING DEVICE, A FIRST DELTA SYSTEM IMAGE THAT COMPRISES DIFFERENCES BETWEEN THE FIRST SYSTEM IMAGE AND THE SECOND REVISED SYSTEM IMAGE ⟶1006

SEND, BY THE COMPUTING DEVICE TO THE FIRST FLEET DEVICE, THE FIRST DELTA SYSTEM IMAGE OR A REFERENCE TO THE FIRST DELTA SYSTEM IMAGE ⟶1008

END

(56) References Cited

OTHER PUBLICATIONS

Larsson, Alexander, "Introducing flat-manager," https://blogs.gnome.org/alexl/2019/03/19/introducing-flat-manager/, Mar. 19, 2019, 5 pages.

Author Unknown, "Deployment Management using hawkBit," Apertis.org, https://www.apertis.org/guides/deployment-management/, Aug. 4, 2021, 9 pages.

Author Unknown, "Edge Management 2022—Create RHEL for Edge images and configure automated management," Red Hat Customer Portal, Nov. 16, 2022, 15 pages.

Author Unknown, "OSTree," Toradex, https://developer.toradex.com/torizon/in-depth/ostree/, Jul. 15, 2020, 10 pages.

Author Unknown, "Using OSTree images—Automotive SIG documentation, Short primer on OSTree," centOS, https://sigs.centos.org/automotive/building/updating_ostree/, accessed online Nov. 28, 2022, 6 pages.

* cited by examiner

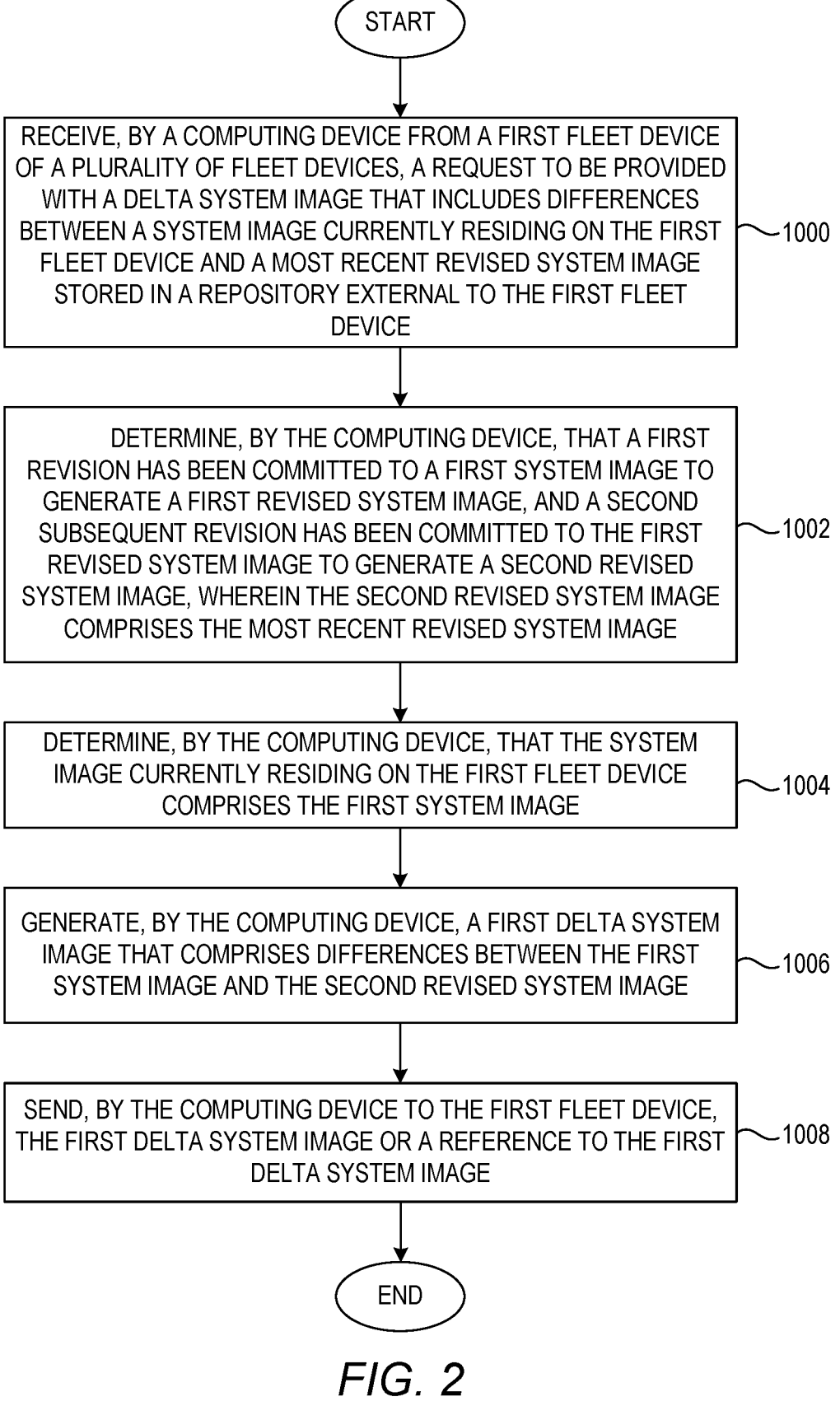

START

RECEIVE, BY A COMPUTING DEVICE FROM A FIRST FLEET DEVICE OF A PLURALITY OF FLEET DEVICES, A REQUEST TO BE PROVIDED WITH A DELTA SYSTEM IMAGE THAT INCLUDES DIFFERENCES BETWEEN A SYSTEM IMAGE CURRENTLY RESIDING ON THE FIRST FLEET DEVICE AND A MOST RECENT REVISED SYSTEM IMAGE STORED IN A REPOSITORY EXTERNAL TO THE FIRST FLEET DEVICE ～1000

DETERMINE, BY THE COMPUTING DEVICE, THAT A FIRST REVISION HAS BEEN COMMITTED TO A FIRST SYSTEM IMAGE TO GENERATE A FIRST REVISED SYSTEM IMAGE, AND A SECOND SUBSEQUENT REVISION HAS BEEN COMMITTED TO THE FIRST REVISED SYSTEM IMAGE TO GENERATE A SECOND REVISED SYSTEM IMAGE, WHEREIN THE SECOND REVISED SYSTEM IMAGE COMPRISES THE MOST RECENT REVISED SYSTEM IMAGE ～1002

DETERMINE, BY THE COMPUTING DEVICE, THAT THE SYSTEM IMAGE CURRENTLY RESIDING ON THE FIRST FLEET DEVICE COMPRISES THE FIRST SYSTEM IMAGE ～1004

GENERATE, BY THE COMPUTING DEVICE, A FIRST DELTA SYSTEM IMAGE THAT COMPRISES DIFFERENCES BETWEEN THE FIRST SYSTEM IMAGE AND THE SECOND REVISED SYSTEM IMAGE ～1006

SEND, BY THE COMPUTING DEVICE TO THE FIRST FLEET DEVICE, THE FIRST DELTA SYSTEM IMAGE OR A REFERENCE TO THE FIRST DELTA SYSTEM IMAGE ～1008

END

*FIG. 2*

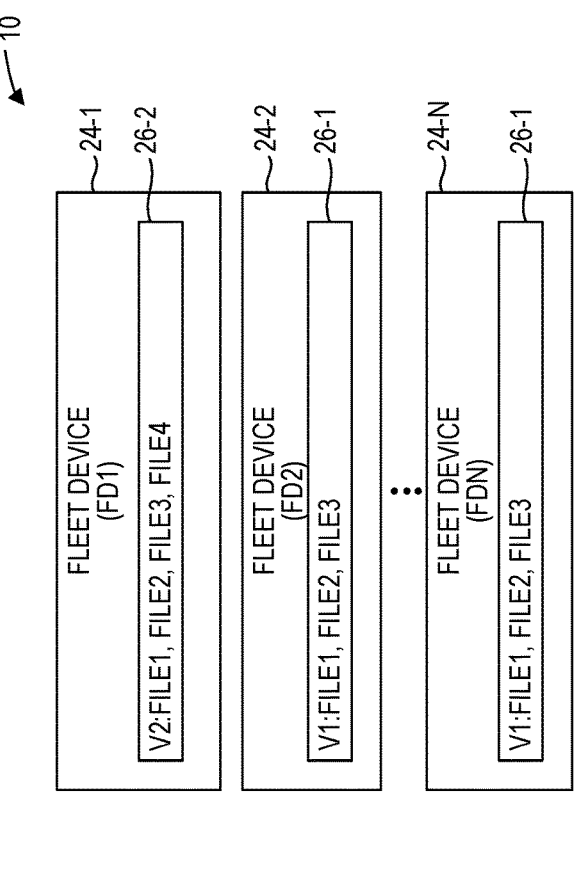
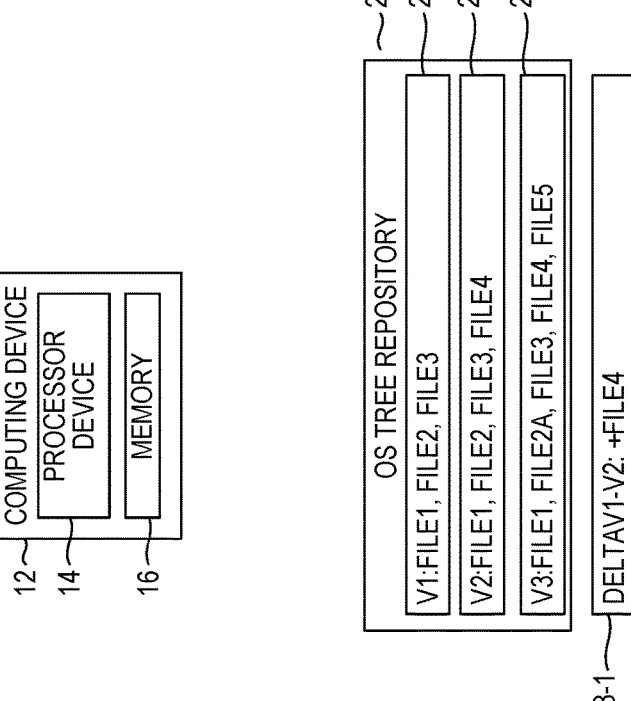
*FIG. 3*

BOOTABLE SYSTEM IMAGE DELTA GENERATOR

BACKGROUND

Technologies, such as OSTree for example, facilitate the generation and subsequent revisions of bootable file system images that can be provided to devices for booting purposes.

SUMMARY

The examples disclosed herein implement a bootable system image delta generator (BSIDG) that generates bootable system images for a plurality of fleet devices.

In one example a method is provided. The method includes receiving, by a computing device from a first fleet device of a plurality of fleet devices, a request to be provided with a delta system image that includes differences between a system image currently residing on the first fleet device and a most recent revised system image stored in a repository external to the first fleet device. The method further includes determining, by the computing device, that a first revision has been made to a first system image to generate a first revised system image, and a second subsequent revision has been made to the first revised system image to generate a second revised system image, wherein the second revised system image comprises the most recent revised system image. The method further includes determining, by the computing device, that the system image currently residing on the first fleet device comprises the first system image. The method further includes accessing, by the computing device, a first delta system image that comprises differences between the first system image and the second revised system image. The method further includes sending, by the computing device to the first fleet device, the first delta system image or a reference to the first delta system image.

In another example a computing device is provided. The computing device includes a memory and a processor device coupled to the memory to receive, from a first fleet device of a plurality of fleet devices, a request to be provided with a delta system image that includes differences between a system image currently residing on the first fleet device and a most recent revised system image stored in a repository external to the first fleet device. The processor device is further to determine that a first revision has been made to a first system image to generate a first revised system image, and a second subsequent revision has been made to the first revised system image to generate a second revised system image, wherein the second revised system image comprises the most recent revised system image. The processor device is further to determine that the system image currently residing on the first fleet device comprises the first system image. The processor device is further to access a first delta system image that comprises differences between the first system image and the second revised system image. The processor device is further to send, to the first fleet device, the first delta system image or a reference to the first delta system image.

In another example a non-transitory computer-readable storage medium is provided. The non-transitory computer-readable storage medium includes executable instructions to cause a processor device to receive, from a first fleet device of a plurality of fleet devices, a request to be provided with a delta system image that includes differences between a system image currently residing on the first fleet device and a most recent revised system image stored in a repository external to the first fleet device. The instructions further cause the processor device to determine that a first revision has been made to a first system image to generate a first revised system image, and a second subsequent revision has been made to the first revised system image to generate a second revised system image, wherein the second revised system image comprises the most recent revised system image. The instructions further cause the processor device to determine that the system image currently residing on the first fleet device comprises the first system image. The instructions further cause the processor device to access a first delta system image that comprises differences between the first system image and the second revised system image. The instructions further cause the processor device to send, to the first fleet device, the first delta system image or a reference to the first delta system image.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a flowchart of a method for bootable system image delta generation according to one implementation;

FIG. 3 is a simplified block diagram of the environment illustrated in FIGS. 1A-1G according to one implementation.

DETAILED DESCRIPTION

Figure 1A:
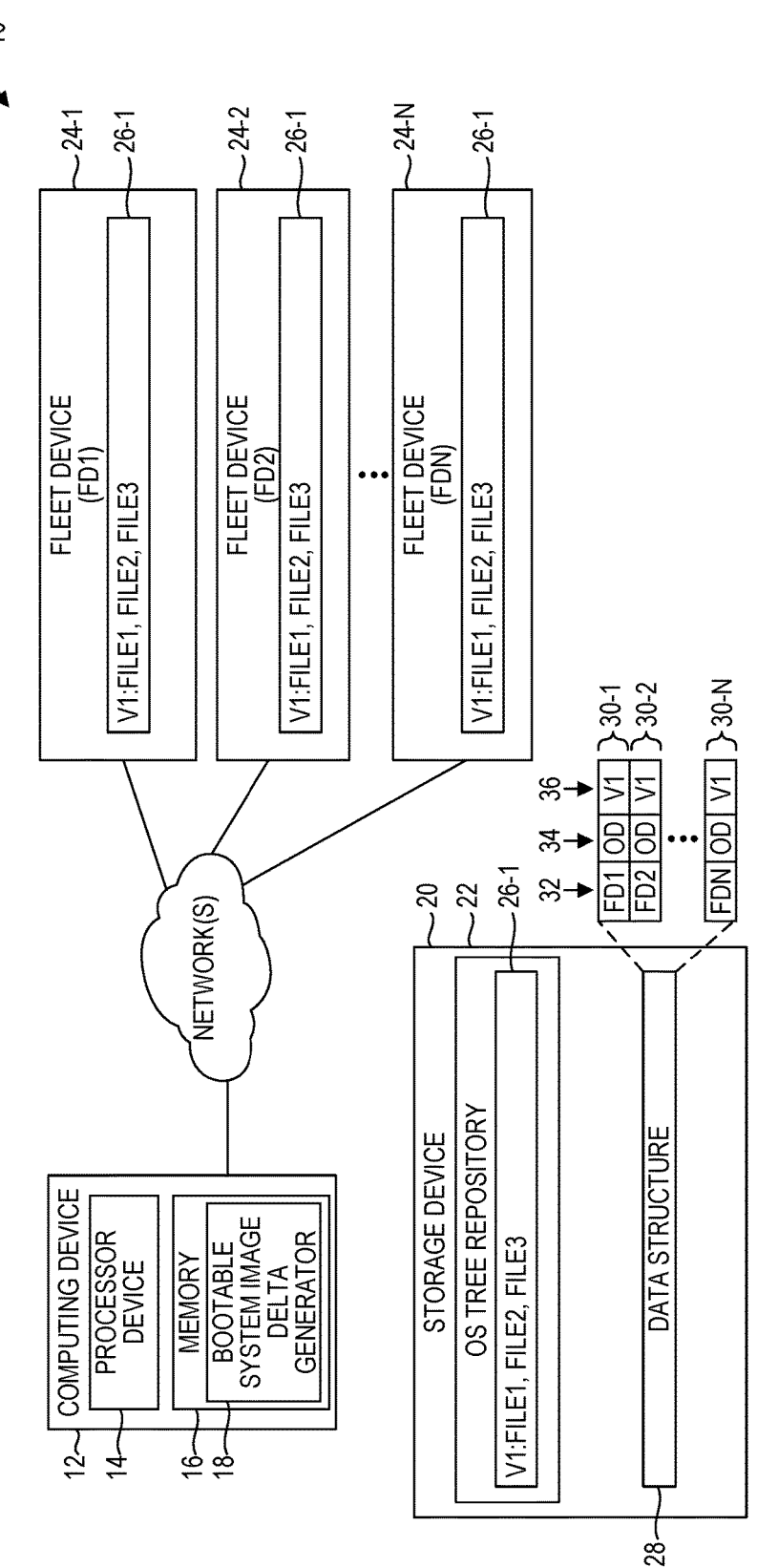
FIGS. 1A-1G are block diagrams of an environment in which examples of a bootable system image delta generator (BSIDG) may be practiced according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Current bootable system image technologies, such as, by way of non-limiting example, OSTree, facilitate the genera- tion and subsequent revisions of a bootable system image (hereinafter referred to as a system image). Some technolo- gies, such as OSTree, also do so in a controlled and trackable manner, similar in many ways to the git mechanism for files. After a new version of a system image is created, it is possible to generate a delta system image that contains the differences between the current version of the system image and a previous version of a system image. Depending on the amount of differences between the current version of the system image and the particular previous version of the system image, generating a delta system image may take time and heavily utilize processor and memory resources.

When a plurality of identical or substantially identical computing devices boot from a system image, it may be desirable to continuously update each computing device with the most recent version of the system image as the system image changes over time. Rather than provide the devices the complete revised system image, the examples disclosed herein provide a delta system image comprising the differences between the system image on device and the most recently revised system image.

However, circumstances may require that the computing devices be updated at different points in time, which may be dependent on characteristics of the computing devices. For instance, if the computing devices are mobile computing devices, a computing device may not always be in commu- nication with a network and may need to wait until they it is in communication with a network before it can be pro- vided a delta system image to bring the computing device up to date. As another example, if the computing devices are resource-constrained computing devices, such as, by way of non-limiting example, Internet-of-Things (IoT) devices, they may need to wait until a time of low utilization before they have sufficient resources to process a delta system image. Consequently, by the time a computing device requests a delta system image, multiple revisions/versions may have been committed to the system image repository, and the particular delta system image needed by one com- puting device may differ from the delta system image needed by another computing device.

Individually generating delta system images each time a computing device requests a delta system image is time- consuming and results in substantial duplicative efforts when a plurality of computing devices may, over a period of time, request the same delta system image. Moreover, in situations where a computing device has a relatively small amount of time to receive a delta system image, such as a mobile computing device that may be in communication with a network for brief periods of time, the time it takes to generate the delta system image for that particular comput- ing device may take longer than the time the computing device will be in communication with the network, ulti- mately resulting in the computing device falling farther and farther behind the most recent version of the system image.

The term "fleet devices" will be used herein to refer to a plurality of computing devices, each of which includes a processor device and a memory, that boot from a system image. A fleet device may comprise any type of computing device, such as an IoT device, an electronic control unit (ECU) of an automobile, a desktop or laptop computing device, a smartphone, a computing tablet, a sensor, or the like.

The examples disclosed herein implement a bootable system image delta generator (BSIDG) that generates delta system images for a plurality of fleet devices. The BSIDG monitors a repository to keep track of revisions made to a system image. The term "revisions" and "versions" may be used herein synonymously. The BSIDG generates delta system images that contain the differences between a most recent version of a system image and a previous version of the system image based on the needs of a particular fleet device. The BSIDG then stores the delta system image so that subsequent fleet devices that require the same delta system image can be provided the delta system image quickly, and to eliminate what would otherwise be repeated processing and memory resource usage necessary to gener- ate the same delta system image time and time again.

FIGS. 1A-1G are block diagrams of an environment 10 in which examples of a bootable system image delta generator (BSIDG) may be practiced according to some implementa- tions. The environment 10 includes a computing device 12, which in turn includes a processor device 14 and a memory 16. A BSIDG 18, which implements some of the function- ality described herein, executes in the memory 16. Solely for purposes of illustration, the examples disclosed herein will be discussed in the context of the OSTree bootable system image generation technology available at github.com/os- treedev/ostree, but the examples are not limited to any particular bootable system image generation technology. The environment 10 includes a storage device 20 on which an OSTree repository 22 resides. The term "OSTree reposi- tory" refers to a repository that stores a bootable system image comprising a plurality of files generated in accor- dance with the libostree project available at github.com/ ostreedev/ostree. The libostree project combines a "git-like" model for committing and downloading bootable filesystem trees along with a layer for deploying bootable filesystem trees and managing the bootloader configuration. The core OSTree model is similar to git in that core OSTree model checksums individual files and has a content-addressed- object store. The core OSTree model is different from git in that the core OSTree model "checks out" the files via hardlinks, and they thus are immutable to prevent corrup- tion.

The environment 10 also includes a plurality of fleet devices 24-1-24-N (generally, fleet devices 24). The fleet devices 24 may comprise any type of computing devices such as, by way of non-limiting example, IoT devices, electronic control units (ECUs) of automobiles, desktop or laptop computing devices, smartphones, computing tablets, sensors, or the like. Each of the fleet devices 24 boots from a bootable system image, in this example an OSTree system image, that is a copy of an OSTree system image stored in the OSTree repository 22. While only three fleet devices 24 are illustrated, in actual practice the fleet devices 24 may number in the hundreds or thousands. At the point in time illustrated in FIG. 1A, the OSTree repository 22 contains an initial version of a bootable OSTree system image 26-1. Each of the fleet devices 24 contains and boots from a copy of the OSTree system image 26-1 that is stored on the respective fleet device 24.

The storage device 20 includes a data structure 28 that contains entries 30-1-30-N (generally, entries 30), each of which corresponds to a fleet device 24-1-24-N. Each entry 30 includes a fleet device identifier (ID) field 32 that contains a fleet device ID that identifies the fleet device 24 to which the entry corresponds, a generation indicator field 34 that indicates whether a delta system image, in this example a delta OSTree system image, should be generated automatically (A) or on-demand (OD) for the fleet device 24 to which the entry 30 corresponds, and a current version ID field 36 that identifies the current version of the OSTree system image that is contained on the fleet device 24 to which the entry 30 corresponds. In this example, at the time illustrated in FIG. 1A, each fleet 24 contains and boots from a copy of the OSTree system image 26-1.

Figure 1B:
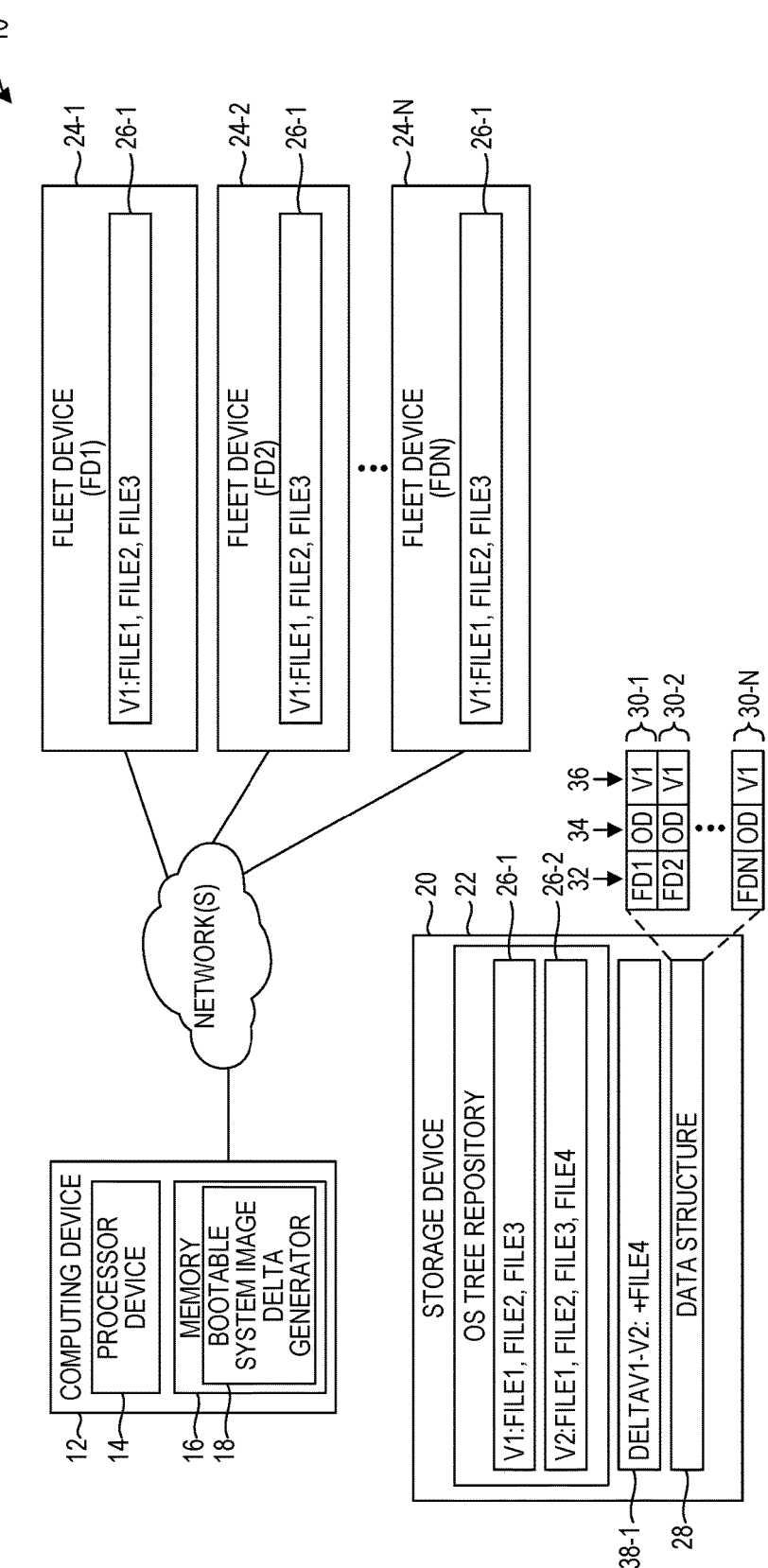

Referring now to FIG. 1B, an engineer commits or otherwise makes a revision to the OSTree system image 26-1 to generate a revised OSTree system image 26-2. The BSIDG 18 may monitor the OSTree repository 22 and determine that the revised OSTree system image 26-2 has been generated. The BSIDG 18 may analyze the generation indicator field 34 of the entries 30 to determine if any fleet device 24 has been configured to have delta OSTree system images generated automatically. In this example, no fleet device 24 has been configured to have delta OSTree system images generated automatically, and thus the BSIDG 18 does not automatically generate a delta OSTree system image. The BSIDG 18 may send a message to each fleet device 24 indicating that a revised OSTree system image has been generated. In other embodiments, the fleet devices 24 may periodically, intermittently, or in response to some event, poll the BSIDG 18 to query whether a revised OSTree system image has been generated.

In this example, at some time subsequent to the generation of the revised OSTree system image 26-2, the fleet device 24-1 sends a request to the BSIDG 18 to be provided with a delta OSTree system image that includes the differences between the OSTree system image that currently resides on the fleet device 24-1 and the most recent revised OSTree system image in the OSTree repository 22.

The request may include information that identifies the OSTree system image 26-1 as being the OSTree system image that currently resides on the fleet device 24-1, or, the BSIDG 18 may access the entry 30-1 that corresponds to the fleet device 24-1 and determines, based on the current version ID field 36, that the OSTree system image 26-1 is the OSTree system image that currently resides on the fleet device 24-1.

In response to the request, the BSIDG 18 first determines that no delta OSTree system image that comprises the differences between the OSTree system image 26-1 and the OSTree system image 26-2 exists. The BSIDG 18 generates a delta OSTree system image 38-1 that comprises the differences between the OSTree system image 26-1 and the OSTree system image 26-2. The BSIDG 18 may generate the delta OSTree system image 38-1 by analyzing the OSTree system image 26-1 and the OSTree system image 26-2. In one embodiment, the BSIDG 18 may generate the delta OSTree system image 38-1 via the use of the "ostree static-delta generate" command. The BSIDG 18 stores the delta OSTree system image 38-1 in a memory, such as in the storage device 20. In some embodiments the delta OSTree system image 38-1 may be stored in the OSTree repository 22.

Figure 1C:
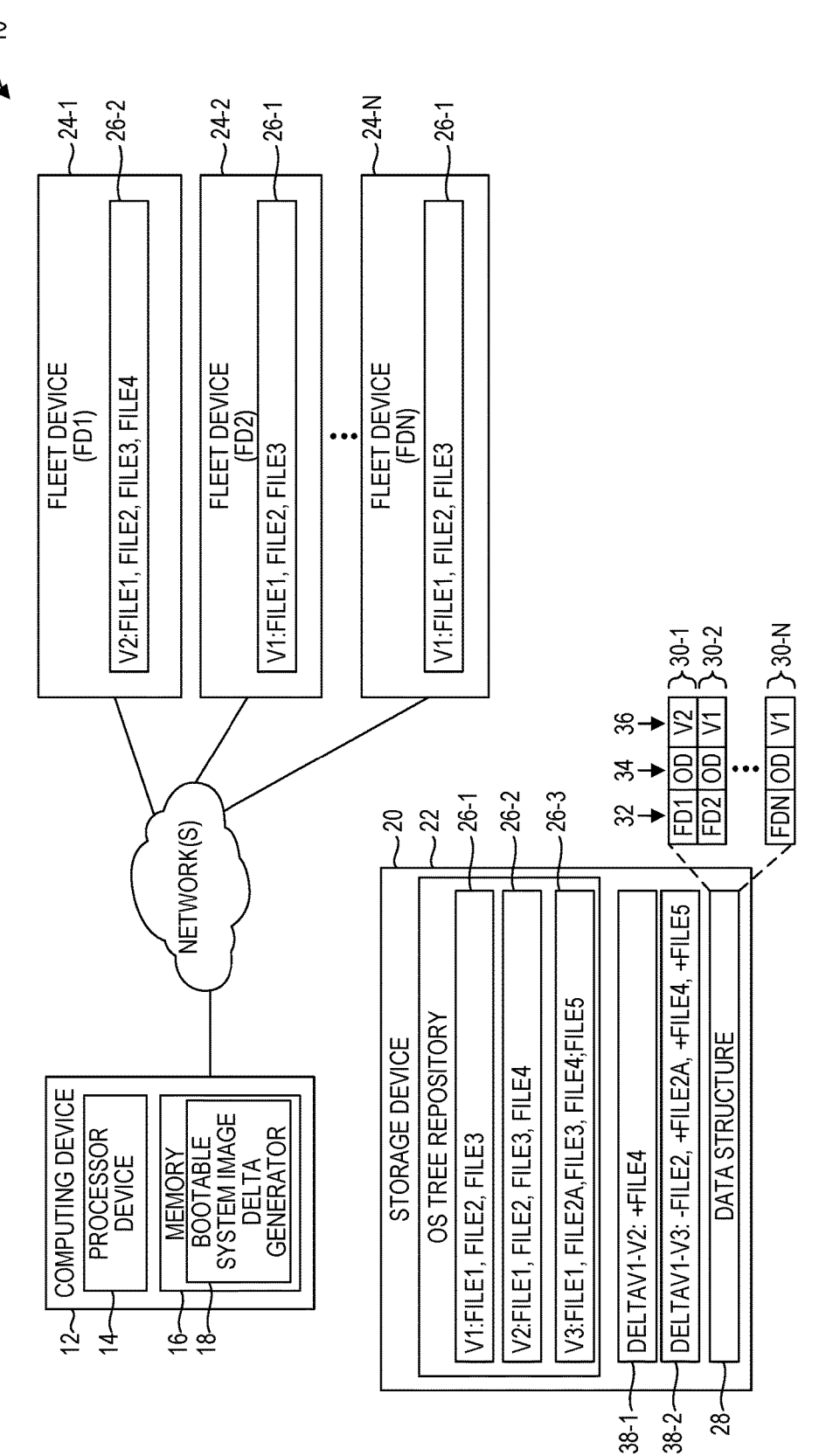

Referring now to FIG. 1C, the BSIDG 18 sends the delta OSTree system image 38-1, or a reference to the delta OSTree system image 38-1, to the fleet device 24-2. The fleet device 24-2 receives the delta OSTree system image 38-1, or the reference to the delta OSTree system image 38-1, merges or otherwise updates the OSTree system image 26-1 with the delta OSTree system image 38-1 to derive the revised OSTree system image 26-2, and reboots to the revised OSTree system image 26-2. The BSIDG 18 updates the current version ID field 36 of the entry 30-1 to indicate that the current OSTree system image 26 contained on the fleet device 24-1 is the revised OSTree system image 26-2.

The engineer now commits a revision to the revised OSTree system image 26-2 to generate a revised OSTree system image 26-3. The BSIDG 18 determines that the revised OSTree system image 26-3 has been generated. The BSIDG 18 analyzes the generation indicator field 34 of the entries 30 to determine if any fleet device 24 has been configured to have delta OSTree system images generated automatically. In this example, no fleet device 24 has been configured to have delta OSTree system images generated automatically, and thus the BSIDG 18 does not automatically generate a delta OSTree system image. The BSIDG 18 sends a message to each fleet device 24 indicating that a revised OSTree system image has been generated.

At some time subsequent to the generation of the revised OSTree system image 26-3, the fleet device 24-2 sends a request to the BSIDG 18 to be provided with a delta OSTree system image that includes the differences between the OSTree system image that currently resides on the fleet device 24-2 and the most recent revised OSTree system image in the OSTree repository 22. The BSIDG 18 accesses the entry 30-2 that corresponds to the fleet device 24-2 and determines, based on the current version ID field 36, that the OSTree system image 26-1 is the OSTree system image that currently resides on the fleet device 24-2.

In response to the request, the BSIDG 18 determines that no delta OSTree system image that comprises the differences between the OSTree system image 26-1 and the OSTree system image 26-3 exists. The BSIDG 18 generates a delta OSTree system image 38-2 that comprises the differences between the OSTree system image 26-1 and the OSTree system image 26-3. The BSIDG 18 stores the delta OSTree system image 38-2 on the storage device 20.

Figure 1D:
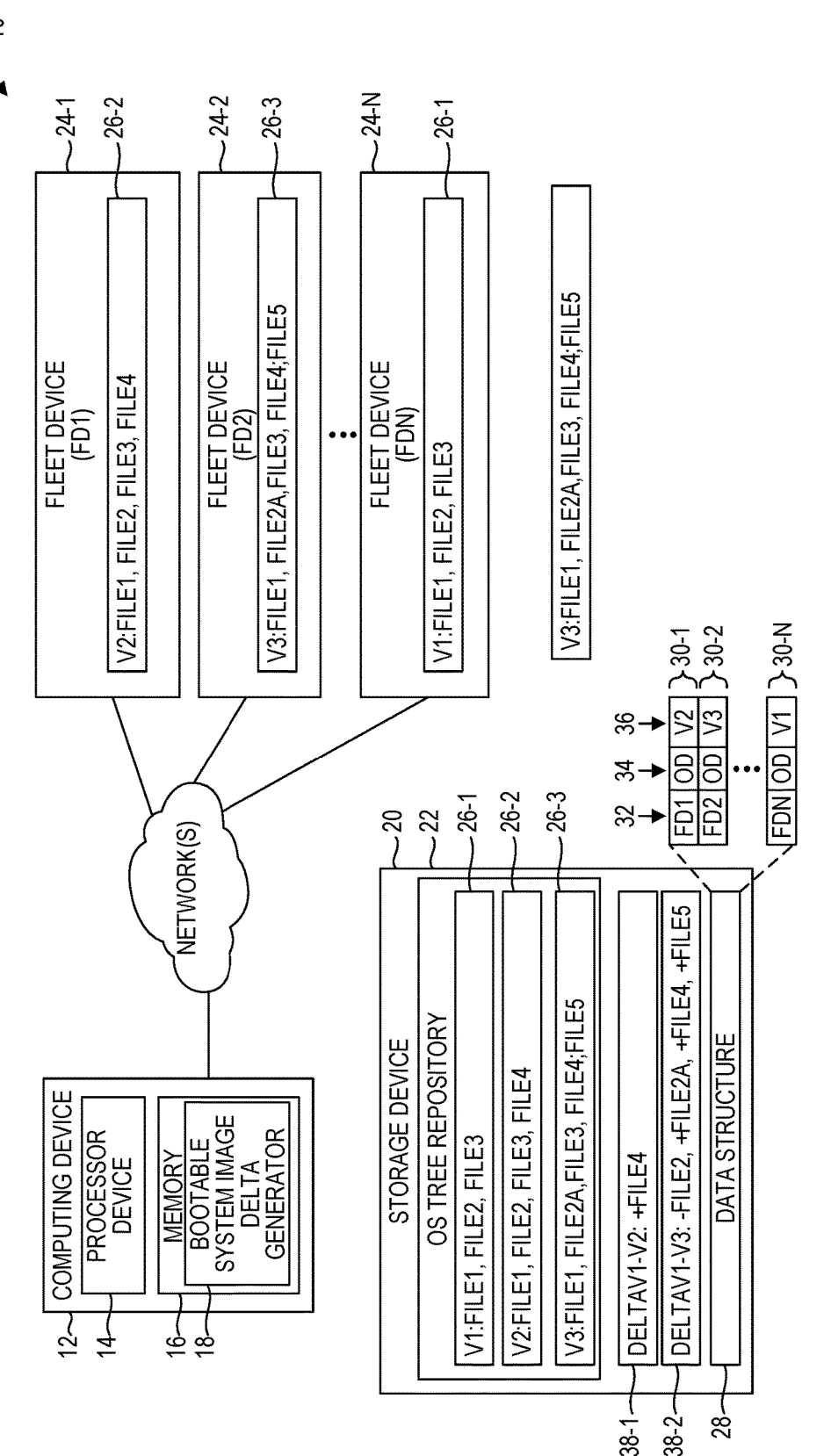

Referring now to FIG. 1D, the BSIDG 18 sends the delta OSTree system image 38-2 to the fleet device 24-2. The fleet device 24-2 receives the delta OSTree system image 38-2, merges or otherwise updates the OSTree system image 26-1 with the delta OSTree system image 38-2 to derive the revised OSTree system image 26-3, and reboots to the revised OSTree system image 26-3. The BSIDG 18 updates the current version ID field 36 of the entry 30-2 to indicate that the current OSTree system image 26 contained on the fleet device 24-2 is the revised OSTree system image 26-3.

The fleet device 24-N sends a request to the BSIDG 18 to be provided with a delta OSTree system image that includes the differences between the OSTree system image that currently resides on the fleet device 24-N and the most recent revised OSTree system image in the OSTree repository 22.

The BSIDG 18 accesses the entry 30-3 that corresponds to the fleet device 24-N and determines, based on the current version ID field 36, that the OSTree system image 26-1 is the OSTree system image that currently resides on the fleet device 24-N.

Figure 1E:
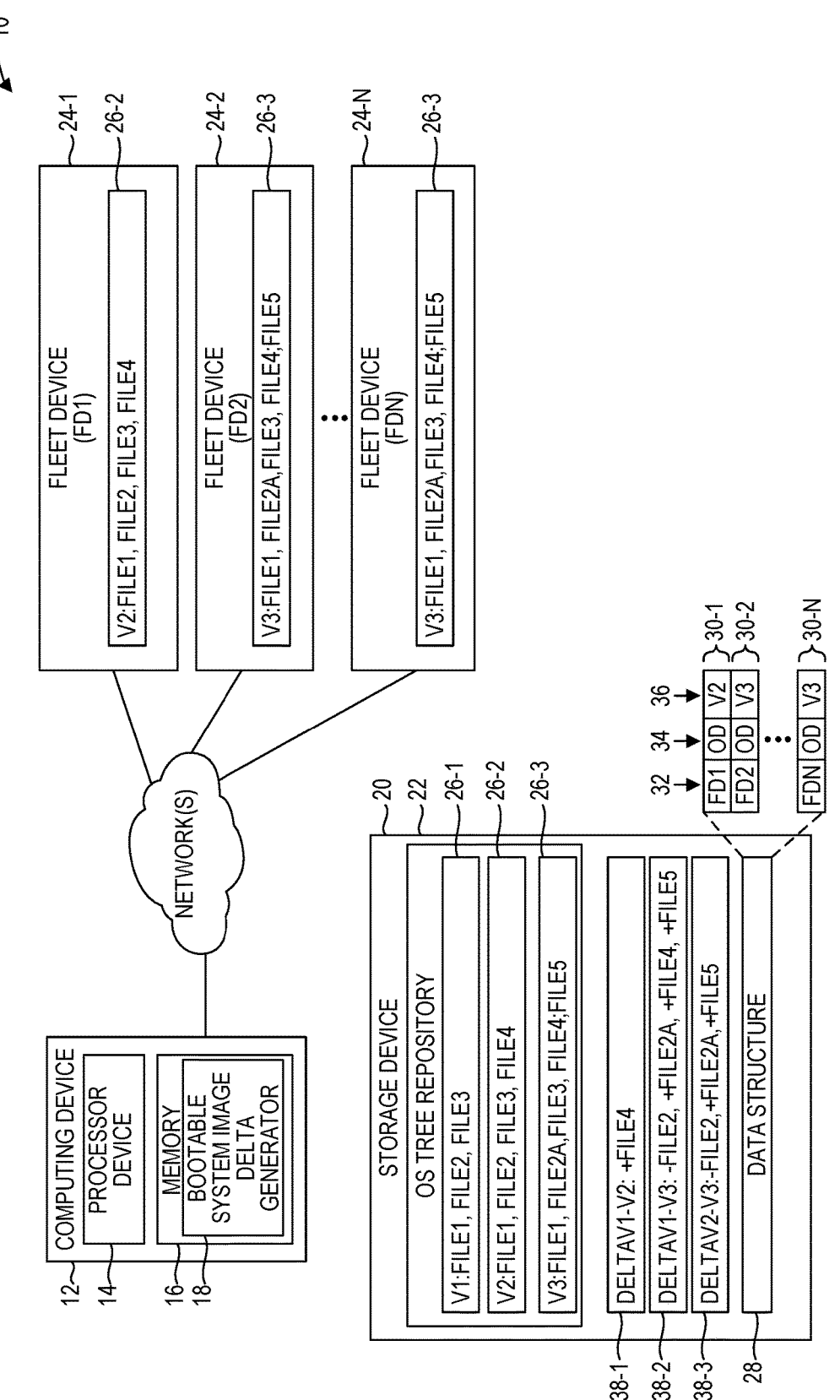

The BSIDG 18 determines that the delta OSTree system image 38-2 that comprises the differences between the OSTree system image 26-1 and the OSTree system image 26-3 exists. Referring now to FIG. 1E, the BSIDG 18 sends the delta OSTree system image 38-2 to the fleet device 24-N. The fleet device 24-N receives the delta OSTree system image 38-2, merges or otherwise updates the OSTree system image 26-1 with the delta OSTree system image 38-2 to derive the revised OSTree system image 26-3, and reboots to the revised OSTree system image 26-3. The BSIDG 18 updates the current version ID field 36 of the entry 30-N to indicate that the current OSTree system image 26 contained on the fleet device 24-N is the revised OSTree system image 26-3.

The fleet device 24-1 sends a request to the BSIDG 18 to be provided with a delta OSTree system image that includes the differences between the OSTree system image that currently resides on the fleet device 24-1 and the most recent revised OSTree system image in the OSTree repository 22. The BSIDG 18 accesses the entry 30-1 that corresponds to the fleet device 24-1 and determines, based on the current version ID field 36, that the OSTree system image 26-2 is the OSTree system image that currently resides on the fleet device 24-1.

Figure 1F:
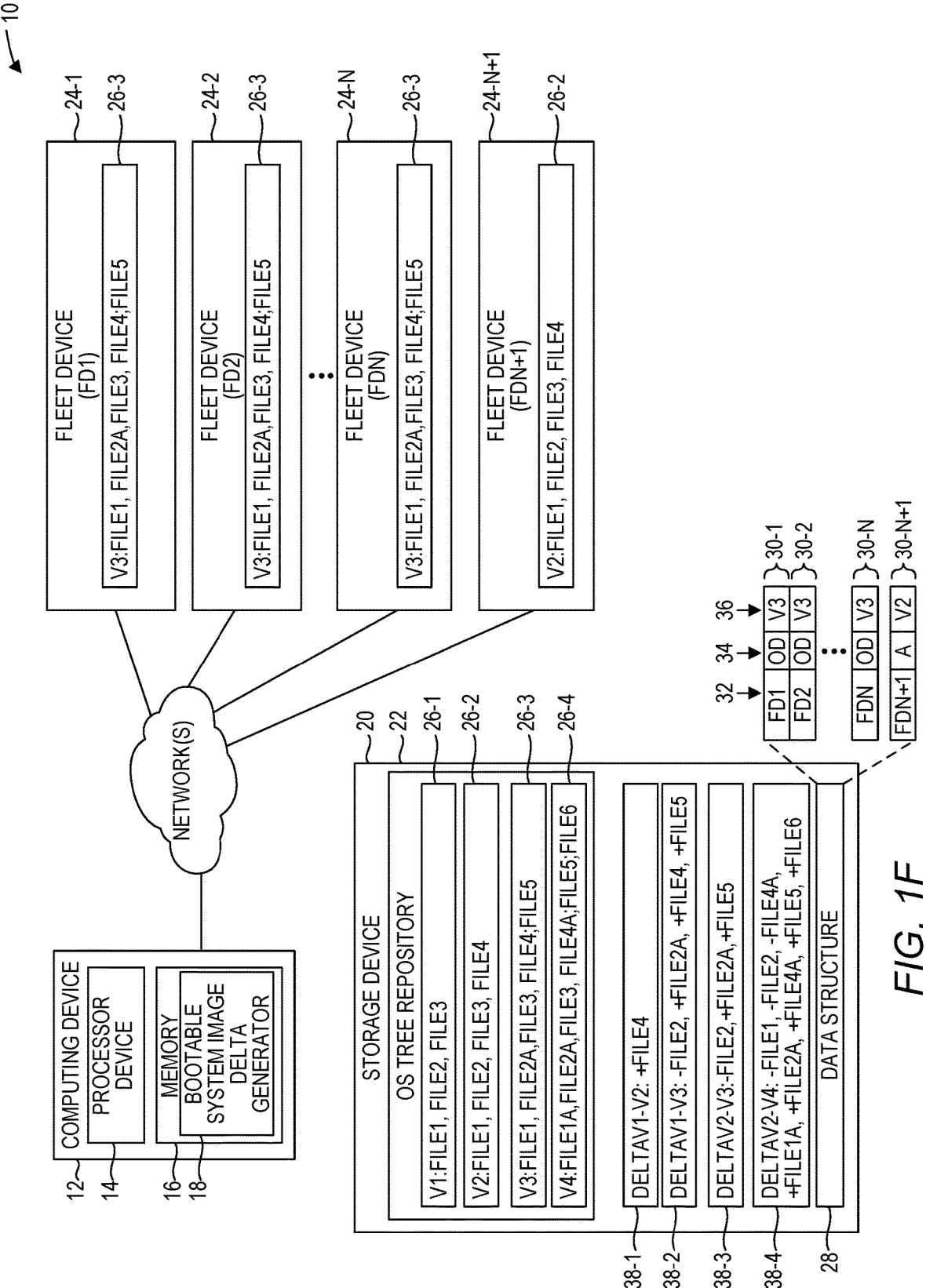

The BSIDG 18 determines that no delta OSTree system image that comprises the differences between the OSTree system image 26-2 and the OSTree system image 26-3 exists. The BSIDG 18 generates a delta OSTree system image 38-3 that comprises the differences between the OSTree system image 26-2 and the OSTree system image 26-3. The BSIDG 18 stores the delta OSTree system image 38-3 on the storage device 20. Referring now to FIG. 1F, the BSIDG 18 sends the delta OSTree system image 38-3 to the fleet device 24-1. The fleet device 24-1 receives the delta OSTree system image 38-3, merges or otherwise updates the OSTree system image 26-2 with the delta OSTree system image 38-3 to derive the revised OSTree system image 26-3, and reboots to the revised OSTree system image 26-3. The BSIDG 18 updates the current version ID field 36 of the entry 30-1 to indicate that the current OSTree system image 26 contained on the fleet device 24-1 is the revised OSTree system image 26-3.

A new fleet device 24-N+1 is added to the plurality of fleet devices 24. A new entry 30-N+1 is added to the data structure 28 indicating that the fleet device 24-N+1 requires that a delta OSTree system image that comprises the differences between the current OSTree system image contained on the fleet device 24-N+1 and the most recent revised OSTree system image be automatically generated as soon as a revised OSTree system image is generated even before the fleet device 24-N+1 requests a delta OSTree system image.

The BSIDG 18 determines, based on the entry 30-N+1, that the current OSTree system image contained on the fleet device 24-N+1 is the revised OSTree system image 26-2, and that the delta OSTree system image 38-3 that comprises the differences between the OSTree system image 26-2 and the OSTree system image 26-3 already exists, and thus that a new delta OSTree system image need not be generated for the fleet device 24-N+1.

The engineer now commits a revision to the revised OSTree system image 26-3 to generate a revised OSTree system image 26-4. The BSIDG 18 determines that the revised OSTree system image 26-4 has been generated. The BSIDG 18 analyzes the generation indicator field 34 of the entries 30 to determine if any fleet device 24 has been configured to have delta OSTree system images generated automatically. In this example, the BSIDG 18 determines that the generation indicator field 34 of the entry 30-N+1 indicates that a delta OSTree system image that comprises the differences between the current OSTree system image contained on the fleet device 24-N+1 and the most recent revised OSTree system image is to be automatically generated as soon as a revised OSTree system image is generated.

The BSIDG 18 determines that no delta OSTree system image that comprises the differences between the OSTree system image 26-2 that currently resides on the fleet device 24-N+1 and the most recent revise OSTree system image 26-4 exists. The BSIDG 18 generates a delta OSTree system image 38-4 that comprises the differences between the OSTree system image 26-2 and the OSTree system image 26-4. The BSIDG 18 stores the delta OSTree system image 38-3 on the storage device 20.

The BSIDG 18 may send a message to each fleet device 24 indicating that a revised OSTree system image has been generated. The fleet device 24-N+1 sends a request to the BSIDG 18 to be provided with a delta OSTree system image that includes the differences between the OSTree system image that currently resides on the fleet device 24-N+1 and the most recent revised OSTree system image in the OSTree repository 22. The BSIDG 18 accesses the entry 30-N+1 that corresponds to the fleet device 24-N+1 and determines, based on the current version ID field 36, that the OSTree system image 26-2 is the OSTree system image that currently resides on the fleet device 24-N+1.

Figure 1G:
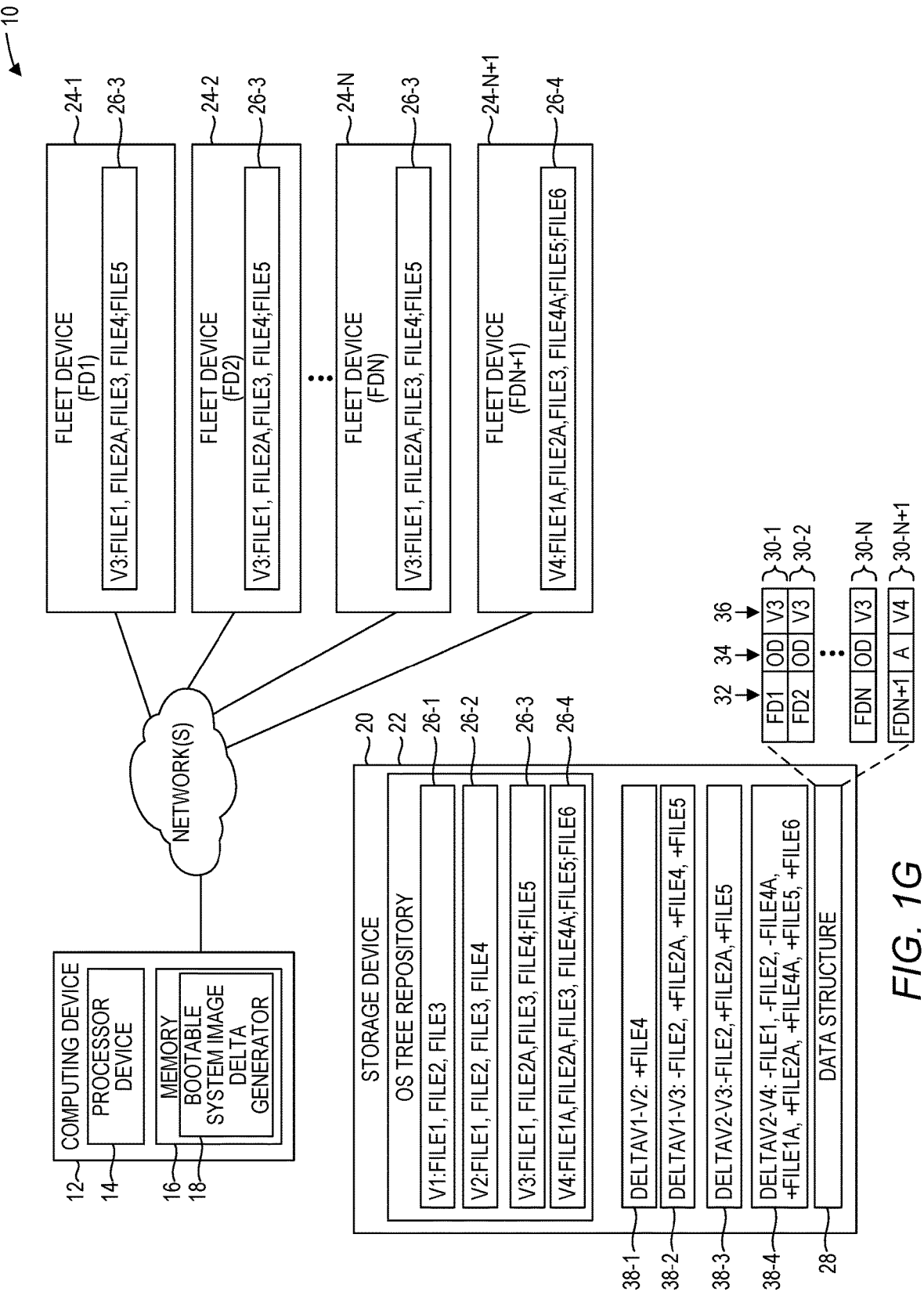

The BSIDG 18 determines that the delta OSTree system image 38-4 that comprises the differences between the OSTree system image 26-2 and the OSTree system image 26-4 exists. Referring now to FIG. 1G, the BSIDG 18 sends the delta OSTree system image 38-4 to the fleet device 24-N+1. The fleet device 24-N+1 receives the delta OSTree system image 38-4, merges or otherwise updates the OSTree system image 26-2 with the delta OSTree system image 38-4 to derive the revised OSTree system image 26-4, and reboots to the revised OSTree system image 26-4. The BSIDG 18 updates the current version ID field 36 of the entry 30-N+1 to indicate that the current OSTree system image 26 contained on the fleet device 24-N+1 is the revised OSTree system image 26-4.

It is noted that, because the BSIDG 18 is a component of the computing device 12, functionality implemented by the BSIDG 18 may be attributed to the computing device 12 generally. Moreover, in examples where the BSIDG 18 comprises software instructions that program the processor device 14 to carry out functionality discussed herein, functionality implemented by the BSIDG 18 may be attributed herein to the processor device 14.

FIG. 2 is a flowchart of a method for bootable system image delta generation according to one implementation. FIG. 2 will be discussed in conjunction with FIGS. 1C-1D. The computing device 12 receives, from the fleet device 24-2 of the plurality of fleet devices 24, a request to be provided with a delta OSTree system image, the delta OSTree system image including differences between the OSTree system image 26-1 currently residing on the fleet device 24-2 and a most recent revised OSTree system image 26-3 stored in the OSTree repository 22 external to the fleet device 24-2 (FIG. 2, block 1000). The computing device 12 determines that a first revision has been committed to the OSTree system image 26-1 to generate the first revised OSTree system image 26-2, and a second subsequent revision has been committed to the first revised OSTree system image 26-2 to generate the second revised OSTree system image 26-3, wherein the second revised OSTree system image 26-3 comprises the most recent revised OSTree system image (FIG. 2, block 1002).

The computing device 12 determines that the OSTree system image currently residing on the first fleet device 24-2 comprises the OSTree system image 26-1 (FIG. 2, block 1004). The computing device 12 generates the delta OSTree system image 38-2 that comprises differences between the OSTree system image 26-1 and the second revised OSTree system image 26-3 (FIG. 2, block 1006). The computing device 12 sends, to the fleet device 24-2, the delta OSTree system image 38-2 or a reference to the delta OSTree system image 38-2 (FIG. 2, block 1008). The reference may include, by way of non-limiting example, a uniform resource locator that refers to the delta OSTree system image 38-2 or any other suitable information that enables the fleet device 24-2 to obtain the delta OSTree system image 38-2 from the storage device 20.

FIG. 3 is a simplified block diagram of the environment 10 illustrated in FIGS. 1A-1G according to one implementation. The environment 10 includes the computing device 12, which in turn includes the memory 16 and the processor device 14 coupled to the memory 16. The processor device 14 is to receive, from the fleet device 24-2 of the plurality of fleet devices 24, a request to be provided with a delta OSTree system image that includes differences between the OSTree system image 26-1 currently residing on the fleet device 24-2 and the most recent revised OSTree system image 26-3 stored in the OSTree repository 22 external to the fleet device 24-2. The processor device 14 is further to determine that a first revision has been committed to the OSTree system image 26-1 to generate the first revised OSTree system image 26-1, and a second subsequent revision has been committed to the first revised OSTree disk 26-2 image to generate the second revised OSTree system image 26-3, wherein the second revised OSTree system image 26-3 comprises the most recent revised OSTree system image. The processor device 14 is further to determine that the OSTree system image currently residing on the fleet device 24-2 comprises the OSTree system image 26-1. The processor device 14 is further to generate the delta OSTree system image 26-3 that comprises differences between the OSTree system image 26-1 and the second revised OSTree system image 26-3, and send, to the fleet device 24-2, the delta OSTree system image 26-2 or a reference to the delta OSTree system image 26-2.

Figure 4:
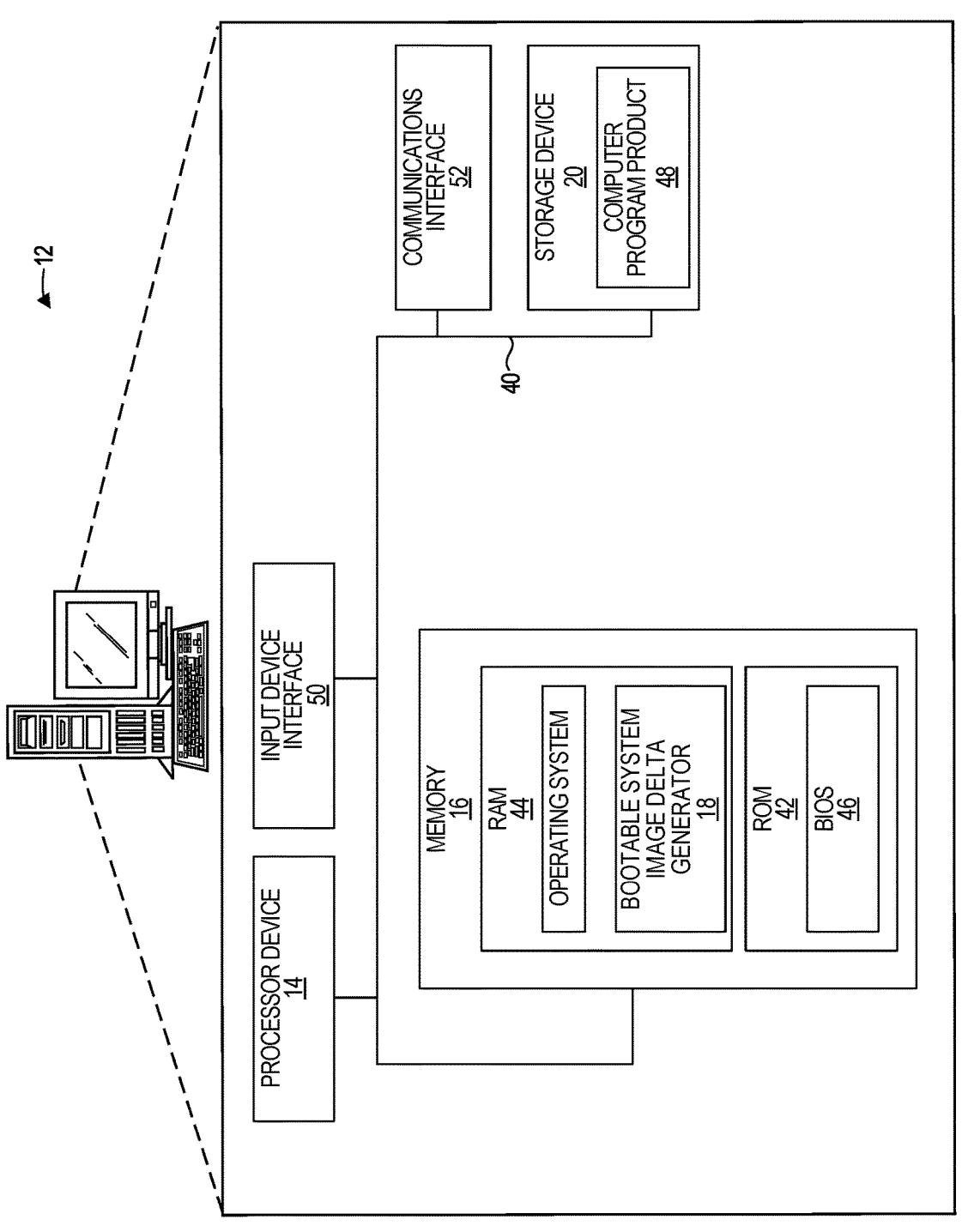
FIG. 4 is a block diagram of a computing device suitable for implementing examples according to one example.

FIG. 4 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 40. The system bus 40 provides an interface for system components including, but not limited to, the system memory 16 and the processor device 14. The processor device 14 can be any commercially available or proprietary processor.

The system bus 40 may be any of several types of bus structures that may further interconnect to a memory bus (with or without a memory controller), a peripheral bus, and/or a local bus using any of a variety of commercially available bus architectures. The system memory 16 may include non-volatile memory 42 (e.g., read-only memory (ROM), erasable programmable read-only memory (EPROM), electrically erasable programmable read-only memory (EEPROM), etc.), and volatile memory 44 (e.g., random-access memory (RAM)). A basic input/output system (BIOS) 46 may be stored in the non-volatile memory 42 and can include the basic routines that help to transfer information between elements within the computing device 12. The volatile memory 44 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like.

A number of modules can be stored in the storage device 20 and in the volatile memory 44, including an operating system and one or more program modules, such as the BSIDG 18, which may implement the functionality described herein in whole or in part. All or a portion of the examples may be implemented as a computer program product 48 stored on a transitory or non-transitory computer-usable or computer-readable storage medium, such as the storage device 20, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the BSIDG 18 in the volatile memory 44, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 50 that is coupled to the system bus 40 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 52 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

determining, by a computing device in communication with a first fleet device of a plurality of fleet devices, that a delta system image that includes differences between a system image currently residing on the first fleet device and a most recent revised system image stored in a repository external to the first fleet device can be generated;

responsive to determining that the delta system image can be generated, determining, by the computing device, that a first revision has been made to a first system image to generate a first revised system image;

responsive to determining that the delta system image can be generated, determining, by the computing device, that a second subsequent revision has been made to the first revised system image to generate a second revised system image, wherein the second revised system image comprises the most recent revised system image;

determining, by the computing device, that the system image currently residing on the first fleet device comprises the first system image;

accessing, by the computing device, a first delta system image that comprises differences between the first system image and the second revised system image; and sending, by the computing device to the first fleet device, the first delta system image or a reference to the first delta system image.

2. The method of claim 1, wherein determining, by the computing device, that the system image currently residing on the first fleet device comprises the first system image comprises receiving, by the computing device from the first fleet device, information that indicates that the first system image currently resides on the first fleet device.

3. The method of claim 1, wherein determining, by the computing device, that the system image currently residing on the first fleet device comprises the first system image comprises:

accessing, by the computing device, a data structure that contains information indicating that the first system image currently resides on the first fleet device; and modifying, by the computing device, the data structure to contain information indicating that the second revised system image currently resides on the first fleet device.

4. The method of claim 1 further comprising:

generating, by the computing device, the first delta system image that comprises differences between the first system image and the second revised system image; and storing, by the computing device, the first delta system image in a memory.

5. The method of claim 4 further comprising:

receiving, by the computing device, a request from a second fleet device to be provided with a delta that includes differences between a system image currently residing on the second fleet device and the most recent revised system image;

determining, by the computing device, that the system image currently residing on the second fleet device comprises the first system image; and sending, by the computing device to the second fleet device, the first delta system image stored in the memory or a reference to the first delta system image stored in the memory.

6. The method of claim 1, further comprising:

subsequent to determining that the second revised system image has been generated, accessing, by the computing device, a data structure that identifies a third fleet device, and identifies a current system image currently residing on the third fleet device;

accessing, by the computing device, information that indicates that, upon a generation of a revised system image, a delta system image is to be generated that comprises differences between a system image currently residing on the third fleet device and the revised system image; and generating, by the computing device, the delta system image that comprises the differences between the system image currently residing on the third fleet device and the revised system image.

7. The method of claim 6 further comprising:

determining, by the computing device, that the system image currently residing on the third fleet device is the first revised system image; and wherein generating, by the computing device, the delta system image that comprises the differences between the system image currently residing on the third fleet device and the revised system image comprises generating, by the computing device, a second delta system image that comprises differences between the first revised system image and the second revised system image.

8. The method of claim 7 further comprising:

subsequent to generating the second delta system image, receiving, by the computing device from the third fleet device, a request for a delta system image; and sending, by the computing device to the third fleet device, the second delta system image.

9. The method of claim 8 further comprising:

modifying, by the computing device, the data structure to contain information indicating that the second revised system image currently resides on the third fleet device.

10. A computing device, comprising:

a memory; and a processor device coupled to the memory to:

determine, for a first fleet device of a plurality of fleet devices, that a delta system image that includes differences between a system image currently residing on the first fleet device and a most recent revised system image stored in a repository external to the first fleet device can be generated;

responsive to determining that the delta system image can be generated, determine that a first revision has been made to a first system image to generate a first revised system image;

responsive to determining that the delta system image can be generated, determine that a second subsequent revision has been made to the first revised system image to generate a second revised system image, wherein the second revised system image comprises the most recent revised system image;

determine that the system image currently residing on the first fleet device comprises the first system image;

access a first delta system image that comprises differences between the first system image and the second revised system image; and send, to the first fleet device, the first delta system image or a reference to the first delta system image.

11. The computing device of claim 10, wherein to determine that the system image currently residing on the first fleet device comprises the first system image, the processor device is further to:

access a data structure that contains information indicating that the first system image currently resides on the first fleet device; and modify the data structure to contain information indicating that the second revised system image currently resides on the first fleet device.

12. The computing device of claim 10 wherein the processor device is further to store, by the computing device, the first delta system image in a memory.

13. The computing device of claim 12 wherein the processor device is further to:

receive a request from a second fleet device to be provided with a delta that includes differences between a system image currently residing on the second fleet device and the most recent revised system image;

determine that the system image currently residing on the second fleet device comprises the first system image; and send, to the second fleet device, the first delta system image stored in the memory or a reference to the first delta system image stored in the memory.

14. The computing device of claim 10, wherein the processor device is further to:

subsequent to determining that the second revised system image has been generated, access a data structure that identifies a third fleet device, and identifies a current system image currently residing on the third fleet device;

access information that indicates that, upon a generation of a revised system image, a delta system image is to be generated that comprises differences between a system image currently residing on the third fleet device and the revised system image; and generate the delta system image that comprises the differences between the system image currently residing on the third fleet device and the revised system image.

15. The computing device of claim 14 wherein the processor device is further to:

determine that the system image currently residing on the third fleet device is the first revised system image; and wherein to generate the delta system image that comprises the differences between the system image currently residing on the third fleet device and the revised system image, the processor device is further to generate a second delta system image that comprises differences between the first revised system image and the second revised system image.

16. A non-transitory computer-readable storage medium that includes executable instructions to cause a processor device to:

determine, for a first fleet device of a plurality of fleet devices, that a delta system image that includes differences between a system image currently residing on the first fleet device and a most recent revised system image stored in a repository external to the first fleet device can be generated;

responsive to determining that the delta system image can be generated, determine that a first revision has been made to a first system image to generate a first revised system image responsive to determining that the delta system image can be generated, determine that a second subsequent revision has been made to the first revised system image to generate a second revised system image, wherein the second revised system image comprises the most recent revised system image;

determine that the system image currently residing on the first fleet device comprises the first system image;

access a first delta system image that comprises differences between the first system image and the second revised system image; and send, to the first fleet device, the first delta system image or a reference to the first delta system image.

17. The non-transitory computer-readable storage medium of claim 16, wherein to determine that the system image currently residing on the first fleet device comprises the first system image, the instructions further cause the processor device to:

access a data structure that contains information indicating that the first system image currently resides on the first fleet device; and modify the data structure to contain information indicating that the second revised system image currently resides on the first fleet device.

18. The non-transitory computer-readable storage medium of claim 16 wherein the instructions further cause the processor device to store the first delta system image in a memory.

19. The non-transitory computer-readable storage medium of claim 18 wherein the instructions further cause the processor device to:

receive a request from a second fleet device to be provided with a delta that includes differences between a system image currently residing on the second fleet device and the most recent revised system image;

determine that the system image currently residing on the second fleet device comprises the first system image; and send, to the second fleet device, the first delta system image stored in the memory or a reference to the first delta system image stored in the memory.

20. The non-transitory computer-readable storage medium of claim 16, wherein the instructions further cause the processor device to:

subsequent to determining that the second revised system image has been generated, access a data structure that identifies a third fleet device, and identify a current system image currently residing on the third fleet device;

access information that indicates that, upon a generation of a revised system image, a delta system image is to be generated that comprises differences between a system image currently residing on the third fleet device and the revised system image; and generate the delta system image that comprises the differences between the system image currently residing on the third fleet device and the revised system image.

* * * * *